Patented Dec. 10, 1935

2,023,591

UNITED STATES PATENT OFFICE 2,023,591

AZO DYES AND METHODS FOR THEIR PREPARATION

Emmet F. Hitch and Miles A. Dahlen, Wilmington, Del., and Martin E. Friedrich, Carneys Point, N. J., assignors to E. I. du Pont de Nemours & Company, Wilmington, Del., a corporation of Delaware No Drawing. Application August 4, 1933, Serial No. 683,624

17 Claims. (Cl. 260—95)

This invention relates to the manufacture of azo dyes and more particularly refers to the preparation of new water-insoluble azo dyes having the following general formula:

Aryl—N=N—A in which aryl represents the residue of a fluorinated arylamide, and A represents the residue of an ice color coupling component.

It is an object of this invention to produce new pigments and dyes having attractive and desirable shades. A further object is to produce dyes which may be developed on the textile material, and impart thereto bright colors of good fastness properties. Additional objects will become apparent from a consideration of the following description.

These objects are attained according to the herein described invention which comprises coupling a diazotized fluorinated arylamine with an ice color coupling component. The fluorinated arylamine is preferably a member of the benzene or naphthalene series, and may have substituted thereon one or more of the well known non-water-solubilizing groups. Likewise, the ice color coupling component is preferably an arylamide of 2-3-hydroxy-naphthoic acid, the arylamide nucleus of which may have substituted thereon one or more non-water-solubilizing groups.

The invention may be more readily understood by a consideration of the following illustrative examples, in which the quantities are stated in parts by weight:

Example 1

40 parts of cotton piece goods, well boiled and dried, were impregnated in a solution of the anilide of 2,3-hydroxy-naphthoic acid prepared in the following manner:

8 parts of the anilide of 2,3-hydroxy-naphthoic acid were pasted up with 8 parts of Turkey red oil, and 13 parts of caustic soda of 34° Bé. strength were added. When the anilide of 2,3-hydroxy-naphthoic acid had dissolved, then enough water was added to bring the volume up to 1600 parts.

The impregnated cloth was wrung out, and without rinsing or drying developed in a solution of the diazonium chloride from p-fluoraniline prepared as follows:

16.7 parts of p-fluoraniline were dissolved in 37 parts of hydrochloric acid (37%) and 250 parts of water. The solution was cooled to about 10° C. with external cooling and the diazotization was carried out with a solution of 11 parts of sodium nitrite dissolved in 25 parts of water, at 5–10° C.

When the diazotization was finished, the solution was filtered and the mineral acidity neutralized with sodium acetate. The dyed cloth was rinsed, soaped at the boil and again rinsed and dried. In this manner a scarlet dyeing having a very good fastness to light and washing was obtained. The dye probably has the formula:

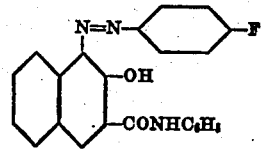

Example 2

40 parts of cotton goods were impregnated with a solution of the m-nitranilide of 2,3-hydroxy-naphthoic acid, made up as follows:

8 parts of the m-nitranilide of 2,3-hydroxy-naphthoic acid were pasted up with 8 parts of Turkey red oil, and 13 parts of caustic soda (34° Bé.) were added. When the m-nitranilide had dissolved, enough water was added to bring the volume up to 1600 parts.

The impregnated cloth was wrung out, and without rinsing or drying, developed in a solution of the diazonium chloride from p-fluoraniline, prepared as described in Example 1.

The dyed cloth was rinsed, soaped at the boil, again rinsed, and dried. In this manner a bright red dyeing was obtained having very good fastness properties. The formula of the dye is probably:

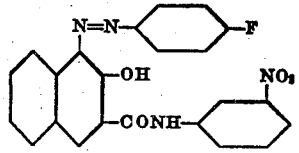

Example 3

40 parts of cotton piece goods, well boiled and dried, were impregnated with a solution of the β-naphthalide of 2,3-hydroxy-naphthoic acid, prepared as follows:

10 parts of the β-naphthalide of 2,3-hydroxy-naphthoic acid were pasted up with 20 parts of Turkey red oil of 50% strength, and 26 parts of caustic soda, of 34° Bé., were added. When the β-naphthalide of 2,3-hydroxy-naphthoic acid was completely in solution, water was added until a volume of 1600 parts was obtained.

The impregnated cloth was wrung out, and without rinsing or drying, developed in a solution of the diazonium chloride from p-fluoraniline, which was prepared as described in Example 1.

The dyed cloth was rinsed, soaped at the boil, again rinsed and dried. In this manner a bright red dyeing, having an excellent fastness to light and washing was obtained. The formula of the dye is probably:

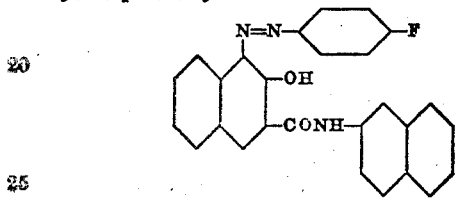

*Example 4*

40 parts of cotton goods were impregnated with a solution of the o-dianisidide of 2,3-hydroxy-naphthoic acid, which was prepared as follows:

10 parts of the o-dianisidide of 2,3-hydroxy-naphthoic acid were pasted with 20 parts of Turkey red oil, and 19 parts of caustic soda, (34° Bé.) were added. When the arylamide had dissolved, water was added to dilute the solution to 1600 parts.

The impregnated cloth was wrung out, and without rinsing or drying, developed in a solution of the diazonium chloride from 2,5-difluoraniline which was prepared as follows:

13 parts of 2,5-difluoraniline were heated with 21 parts of hydrochloric acid (37%) and 200 parts of water. When the base had dissolved, the solution was cooled to about 10° C., and diazotized by adding 7 parts of sodium nitrite dissolved in 20 parts of water, at 10–15° C. When the diazotization was finished, the solution was filtered, and the mineral acidity neutralized with sodium acetate.

The dyed cloth was rinsed, soaped at the boil, again rinsed, and dried. In this manner a reddish-brown dyeing, having good fastness to light was obtained. This dye probably has the formula:

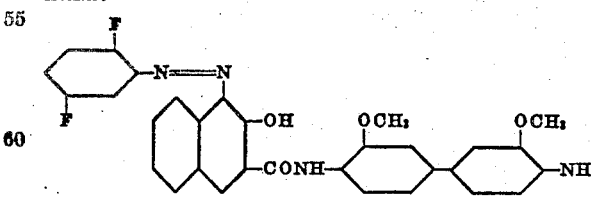

*Example 5*

Cotton goods were impregnated with a solution of the o-toluidide of 2,3-hydroxy-naphthoic acid, prepared as follows:

12.7 parts of the o-toluidide of 2,3-hydroxy-naphthoic acid were pasted up with 30 parts of Turkey red oil of 50% strength, and 26 parts of caustic soda of 34° Bé. were added. When the o-toluidide, of 2,3-hydroxy-naphthoic acid was completely in solution, water was added until a volume of 1600 parts was obtained.

The impregnated goods were wrung out, and developed in a solution of the diazonium chloride from 2,5-difluoraniline, which was prepared as described in Example 4.

The dyed goods were rinsed, soaped at the boil, again rinsed, and dried. In this manner a red dyeing having good fastness to light and washing was obtained. The dye probably has the formula:

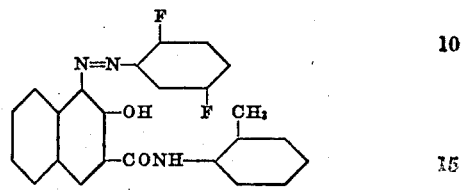

*Example 6*

Cotton piece goods were impregnated with a solution of the 4-chlor-2-methyl-anilide of 2,3-hydroxy-naphthoic acid, which was prepared as follows:

11.9 parts of the 4-chlor-2-methyl-anilide of 2,3-hydroxy-naphthoic acid were pasted with 20 parts of Turkey red oil of 50% strength, and 26 parts of caustic soda of 34° Bé. were added. When the intermediate had dissolved completely, water was added until a volume of 1600 parts was obtained.

The impregnated cloth was wrung out and developed in a solution of the diazonium chloride from o-fluoraniline which was prepared as follows:

12 parts of o-fluoraniline were dissolved in a mixture of 26 parts of hydrochloric acid (37%) and 200 parts of hot water. The solution was then cooled to 10–15° C., and a solution of 7 parts of sodium nitrite dissolved in 20 parts of water were added. When the diazotization was finished, the solution was filtered and the mineral acidity neutralized with sodium acetate.

The dyed cloth was rinsed, soaped at the boil, again rinsed, and dried. In this manner a scarlet dyeing having very good fastness to light and washing was obtained. The dye has very probably the formula:

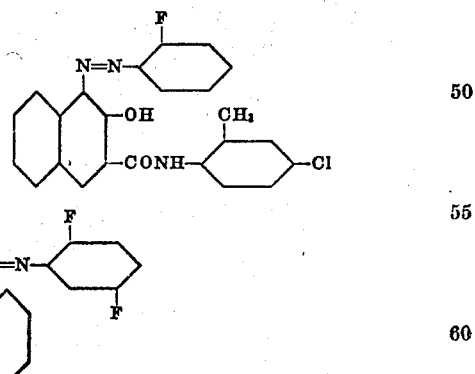

*Example 7*

Cotton piece goods were impregnated with a solution of the alpha-naphthalide of 2,3-hydroxy-naphthoic acid, which was prepared as follows:

7 parts of the a-naphthalide of 2,3-hydroxy-naphthoic acid, were pasted with 8 parts of Turkey red oil, and 14 parts of caustic soda of 34° Bé. were added. When the intermediate was completely in solution, water was added until the volume had been brought up to 1600 parts.

The impregnated goods were wrung out and developed in a solution of the diazonium chloride from o-fluoraniline, prepared as described in Example 6.

The dyed goods were rinsed, soaped at the boil, again rinsed, and dried. In this manner a scarlet dyeing, having good fastness to light and washing was obtained. The dye probably has the formula:

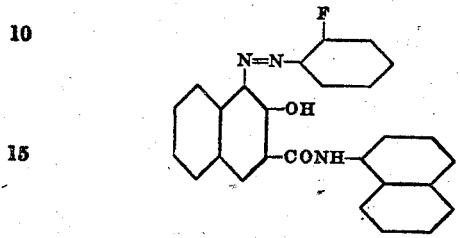

Example 8

12.5 parts of 4-fluor-3-amino-toluene were dissolved in 25 parts of hydrochloric acid (37%) and 100 parts of water. The solution was cooled to 5–10° C. with external cooling, and the diazotization carried out, at 5–10° C., with a solution of 6.9 parts of sodium nitrite, in 25 parts of water. The solution of the diazo was filtered from charcoal, and added slowly to a mixture of 13 parts of piperidine-alpha-carboxylic acid, and 150 parts of water, at 5° C. The solution was kept alkaline to phenolphthalein papers by the addition of soda ash. When the reaction was complete as was shown by the disappearance of the test for diazo salt, the solution was heated to about 40° C., and salt was added until the diazoimino compound was completely precipitated as an oil. The oil was separated from the salt solution and was dried at 50° C. under reduced pressure. The solid which was obtained had a purity of about 80%.

A printing paste was made up, by mixing:

6.2 parts of a dry mixture of
    3.2 parts of the o-toluidide of
        2,3-hydroxy-naphthoic acid
    3.0 parts of the solid diazoimino compound obtained above
3.0 parts of caustic soda (40° Bé.)
65.0 parts of starch tragacanth thickener
25.8 parts of water
___
100.0

Cotton piece goods were printed from an engraved roll with the mixture obtained above, dried, and developed by exposing to the action of live steam containing the vapors of acetic acid. The developed prints were rinsed with water, soaped at the boil, again rinsed, and dried.

In this manner a bright scarlet print, having very good fastness properties was obtained. The ice color produced may be represented by the formula:

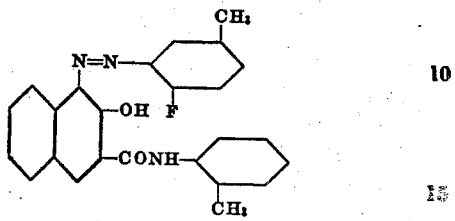

Example 9

15 parts of the 2-3-hydroxy-naphthoyl-derivative of m-nitraniline were pasted with 30 parts of alcohol, and 20 parts of caustic soda (34° Bé.) were added. When the compound had dissolved, water was added until a volume of 1000 parts was obtained.

5 parts of m-fluoraniline were dissolved in a mixture of 11 parts of hydrochloric acid (37%) and 100 parts of water. The solution was cooled to 5–10° C. at which temperature the diazotization was carried out with a mixture of 3.1 parts of sodium nitrite in 10 parts of water. When the diazotization was finished, the solution was clarified, and added slowly with vigorous agitation to the solution of the 2-3-hydroxy-naphthoyl derivative of m-nitraniline obtained as described above. The pigment was filtered, washed with water, and then stirred with alcoholic caustic solution to remove the unreacted m-nitraniline of 2-3-hydroxy-naphthoic acid. The red solid was then dried and recrystallized from hot nitrobenzene. It has the probable formula:

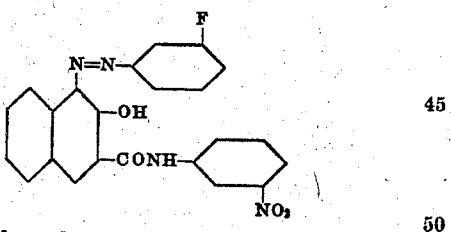

Many other dyes may be prepared by the method described in the examples cited above, when either the 2-3-hydroxy-napthoyl derivatives, or the bases are varied. The following list cites a number of them:

| Ice color coupling component 2,3-hydroxy-naphthoyl derivative of | Diazo component | Shade | Light fastness | Washing fastness | Chlorine ½° Bé'. |
|---|---|---|---|---|---|
| Aniline | o-Fluoraniline | Scarlet | Very good | Very good | |
| m-Nitroaniline | do | Bright red | Good | do | |
| o-Toluidine | do | Orange | Very good | do | |
| p-Anisidine | do | Scarlet to red | do | do | |
| 2,5-difluoraniline | do | Scarlet | Poor | do | |
| p-Fluoraniline | do | Orange | do | do | |
| β-naphthylamine | do | Red | Good | do | |
| 2,5-dimethoxyaniline | do | Yellowish-brown | do | do | |
| o-Dianisidine | do | Reddish-brown | Very good | do | |
| p-Amino-benzanilide | do | Reddish-orange | Poor | do | |
| m-Nitraniline | 2,5-difluoraniline | Red | Good | do | |
| 4-chlor-2-methylaniline | do | Scarlet | Very good | do | |
| p-Anisidine | do | Red | do | do | |
| 2,5-difluoraniline | do | Scarlet | Poor | do | |
| p-Fluoraniline | do | Orange | Good | do | |
| β-naphthylamine | do | Red | Very good | do | |
| 2,5-dimethoxyaniline | do | Yellowish-brown | Good | do | |
| α-naphthylamine | do | Bordeaux | Very good | do | |
| o-Dianisidine | do | Reddish-brown | do | do | |
| p-Amino-benzanilide | do | Orange | Poor | do | |
| Aniline | do | Red | Very good | do | |

| Ice color coupling component 2,3-hydroxy-naphthoyl derivative of | Diazo component | Shade | Light fastness | Washing fastness | Chlorine ½° Bé. |
|---|---|---|---|---|---|
| o-Toluidine | p-Fluoraniline | Orange | Very good | Very good | |
| 4-chlor-2-methyl-aniline | do | Red | do | do | |
| p-Anisidine | do | Scarlet | do | do | |
| m-Aminobenzo-trifluoride | do | do | do | do | |
| β-naphthylamine | do | Red | do | do | |
| 2,5-dimethoxyaniline | do | Scarlet | do | do | |
| α-naphthylamine | do | do | do | do | |
| o-Dianisidine | do | Reddish-brown | do | do | |
| p-Fluoraniline | do | Scarlet | Good | do | |
| Aniline | 3-fluor-4-methoxy-aniline | Red | Fair | do | Fair. |
| o-Toluidine | do | do | do | do | Do. |
| β-naphthylamine | do | do | do | do | Do. |
| p-Amino-benzanilide | do | do | do | do | Good. |
| o-Anisidine | do | do | do | do | Do. |
| Aniline | m-Fluoraniline | Reddish-orange | Very good | do | Very good. |
| o-Toluidine | do | Orange | do | do | Do. |
| o-Toluidine | 2,5-difluoraniline | Scarlet | do | | |
| o-Ethylaniline | do | do | do | | |
| o-Ethylaniline | 4-fluor-3-amino-toluene | do | do | | |
| o-Phenetidine | do | Red | do | | |
| o-Toluidine | p-Fluoraniline | Reddish-orange | do | | |
| o-Phenetidine | do | do | do | | |
| Aniline | do | do | do | | |
| m-Xylidine | do | do | do | | |

| Ice color component | Diazo component | Shade | Light | Chlorine ½° Bé. |
|---|---|---|---|---|
| p-Anisidide of α-naphtho-carbazole-7-hydroxy-6-carboxylic acid. | 3-fluor-4-methoxy-aniline | Black | Good | |
| Diaceto-acet-o-tolidide | do | Yellow | Poor | Poor. |
| o-Toluidide of 2-hydroxy-anthracene-3-carboxylic acid | do | Blue | do | Fair. |
| o-Toluidide of 2-hydroxy-anthracene-3-carboxylic acid | m-Fluoraniline | Red | do | Do. |
| p-Anisidide of α-naphtho-carbazole-7-hydroxy-6-carboxylic acid. | do | Bordeaux | Good | Good. |
| 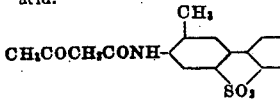 | 2,5-difluoraniline | Yellow | | |
| 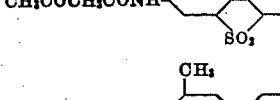 | 4-fluor-3-amino-toluene | do | | |
| 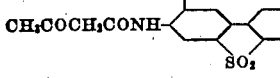 | p-Fluoraniline | do | | |

It is to be understood that the aforementioned examples are merely illustrative of the numerous components which come within the scope of the instant invention and may be used with satisfactory results. For instance, in addition to the arylamines heretofore described the following representative amines may be utilized:

(1) Halogenated fluoranilines, such as 2-fluoro-5-chloro-aniline, 2-fluoro-4-bromo-aniline, 2-fluoro-4-iodo-aniline, 3,4-difluoro-aniline, and 4-fluoro-2,6-dichloro-aniline;

(2) Fluoro-alkyl-anilines, such as 4-fluoro-2-toluidine, 5-fluoro-2-toluidine, 4-fluoro-3-amino-ethylbenzene, 4-fluoro-5-amino-m-xylene, 5-fluoro-2-amino-p-xylene and 2-chloro-5-amino-4-fluoro-m-xylene;

(3) Nitro-fluoro-anilines, such as 4-fluoro-2-nitraniline, 2-fluoro-4-nitro-aniline and 4-fluoro-5-nitro-2-amino-toluene;

(4) Acylamino-fluoroanilines, such as 2-fluoro-4-benzoylamino-aniline, and 2-fluoro-4-benzoyl-amino-6-amino-toluene;

(5) Amino-fluoro-benzotrifluorides, such as 5-amino-2-fluoro-benzotrifluoride and 3-amino-4-fluoro-benzotrifluoride;

(6) Fluoro-alkoxy- and aryloxy-anilines, such as 4-fluoro-2-amino-anisole, 4-fluoro-2-amino-diphenylether, 4-fluoro-3-amino-phenetole and 4-fluoro-2,5-dimethoxy-aniline;

(7) Fluoro-naphthylamines, such as 4-fluoro-α-naphthylamine, 1-fluoro-2-naphthylamine and 6-amino-1-fluoro-2-methoxy-naphthalene;

(8) Fluoro-amino-diphenyls, such as 4-fluoro-4'-amino-diphenyl, 4,4'-difluoro-3-amino-diphenyl, and 3,3'-difluoro-4,4'-diamino-diphenyl;

(9) Fluoro-amino-diphenylmethanes, such as 4'-fluoro-4-amino-diphenylmethane.

Although arylamides of 2,3-hydroxy-naphthoic acid are preferred as coupling components, the invention is by no means restricted thereto. In general, it may be stated that any of the numerous ice color coupling components, well known to one skilled in the art, may be utilized with excellent results. Among these commonly known and widely used ice color coupling components mention may be made of the following:

(1) The arylamides of various hydroxy-arylcarboxylic acids, such as—
  2-hydroxy-3-naphthoic acid
  2-hydroxy-3-naphthoic acid substituted in the 6 or 7 position by alkyl, alkoxy, amino, alkylamino and arylamino radicals
  2-hydroxy-carbazole-3-carboxylic acid
  7-hydroxy-α-naphthocarbazole-6-carboxylic acid
  2-hydroxy-anthracene-3-carboxylic acid
  3-hydroxy-phenanthrene-2-carboxylic acid
  3-hydroxy-diphenylamine-4-carboxylic acid Such arylamides may be prepared from numerous arylamines, among which may be mentioned aniline, the toluidines and xylidines, halogenated anilines and other ring-substituted anilines, anisidines, and phenetidines as well as their substitution products, benzidine and other aminodiphenyls, 4,4'-diamino-diphenylether and other aryloxy-anilines, 4,4'-diamino-azobenzene and other amino-azobenzenes, etc.

(2) Acyl-acetyl derivatives of arylamines and arylene-diamines, such as acetoacetanilide, diacetoacetyl-tolidine, benzoyl-acetanilide, etc.

(3) Acylamino-naphthols, such as 1-benzoylamino-7-naphthol, 1-o-chloro-benzoylamino-5-naphthol;

(4) Alpha-naphthol substituted by acyl groups, such as 4-acetyl-1-naphthol and 4-benzoyl-1-naphthol;

(5) Aryl-alkyl-pyrazolones, such as 1-phenyl-3-methyl-5-pyrazolone;

(6) Dihydroxy-quinolines, such as 2,4-dihydroxy-quinoline.

As previously mentioned, the arylamines selected for use herein as diazo components may have substituted thereon non-water-solubilizing groups. Typical members selected from among the numerous substituents coming within this class are alkyl, alkoxy, aralkyl, aryl, aryloxy, nitro, acylamino, trifluoromethyl, chloro-, bromo-, iodo- and fluoro-groups. Water-solubilizing groups which should not be substituted on the compounds selected for use are those such as the hydroxy, sulfonic acid and carboxylic acid groups. In general, it may be stated that the ice color coupling components may be substituted according to the aforementioned instructions, given with respect to the diazo components.

The compounds described herein may be used in the production of pigments and dyes according to well known methods. For instance, if it is desired to produce a pigment, a solution or suspension of the coupling component in water may be treated with a diazo solution prepared from the arylamines described herein, coupling usually taking place in the presence of acid binding agents. Where it is desired to dye textile materials one of the following commonly used methods may be selected:

(1) Textile fibers may be padded with ice color coupling components, then immersed in diazo solutions prepared from the hereindescribed arylamines, usually in the presence of acid binding agents.

(2) Textile fibers may be padded with ice color coupling components and printed with pastes containing diazo salts prepared from the arylamines.

(3) The arylamines may be converted to their corresponding anti-diazotates (nitrosamines) and textile fibers impregnated with such anti-diazotates and ice color coupling components. The impregnated fibers are then subjected to the action of weak acids, preferably at elevated temperatures.

(4) The arylamines may be converted to water-soluble diazoimino derivatives, for example by reacting the diazo salts prepared therefrom with secondary aliphatic, aromatic or heterocyclic amines containing groups such as hydroxyl, sulfonic acid and/or carboxylic acid to impart water-solubility thereto. Textile fibers may then be impregnated with mixtures of these diazoimino derivatives and ice color coupling components and subsequently subjected to the action of heat and weak acids.

The products described herein are quite efficacious in imparting bright colors of excellent fastness to textile materials, particularly cotton and regenerated cellulose. These colors are readily prepared, and are adapted to use in any of the common dyeing processes. Likewise, the products are quite useful when produced in the form of pigments.

As many apparently widely different embodiments of this invention may be made without departing from the spirit and scope thereof, it is to be understood that the invention is not limited to the specific embodiments thereof except as defined in the appended claims.

We claim:
1. A process for making water-insoluble azo dyes which comprises coupling a diazotized arylamine having a fluorinated nucleus with an ice color coupling component.

2. A process for making water-insoluble azo dyes which comprises coupling a diazotized arylamine, selected from the group consisting of arylamines of the benzene and naphthalene series having a fluorinated nucleus, with an ice color coupling component.

3. A process for making water-insoluble azo dyes which comprises coupling a diazotized arylamine selected from the group consisting of arylamines of the benzene and naphthalene series having a fluorinated nucleus which may have substituted thereon members selected from the group consisting of alkyl, alkoxyl aralkyl, aryl, aryloxy, nitro, acylamino, trifluoromethyl and halogen radicals with an ice color coupling component.

4. A process for making water-insoluble azo dyes which comprises coupling a diazotized arylamine of the fluorinated benzene series with an arylamide of 2-3-hydroxy-naphthoic acid.

5. A process for making water-insoluble azo dyes which comprises coupling diazotized fluoraniline with an arylamide of 2-3-hydroxy-naphthoic acid.

6. Water-insoluble azo dyes having the following general formula:

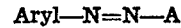

Aryl—N=N—A in which aryl represents the radical of an arylamine having a fluorinated nucleus, and A represents the radical of an ice color coupling component.

7. Water-insoluble azo dyes having the following general formula:

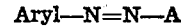

Aryl—N=N—A in which aryl represents the radical of an arylamine of the benzene or naphthalene series having a fluorinated nucleus, and A represents the radical of an ice color coupling component.

8. Water-insoluble azo dyes having the following general formula:

Aryl—N=N—A in which aryl represents the radical of an arylamine of the benzene or naphthalene series having a fluorinated nucleus which may have substituted thereon members selected from the group consisting of alkyl, alkoxy, aralkyl, aryl, aryloxy, nitro, acylamino, trifluoromethyl and halogen radicals, and A represents the radical of an ice color coupling component.

9. Water-insoluble azo dyes having the following general formula:

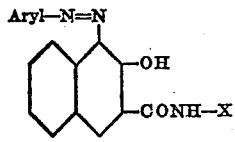

in which aryl represents the radical of an arylamine of the fluorinated benzene series, and X represents an aryl radical.

10. Water-insoluble azo dyes having the following general formula:

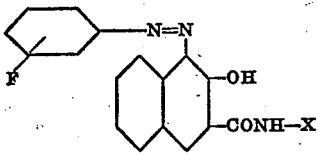

in which X represents the radical of an arylamide of the benzene series.

11. A process for making water-insoluble azo dyes which comprises coupling a diazotized arylamine of the fluorinated naphthalene series with an arylamide of 2,3 hydroxynaphthoic acid.

12. A process for making water-insoluble azo dyes which comprises coupling a diazotized arylamine of the fluorinated diphenyl series with an arylamide of 2,3 hydroxynaphthoic acid.

13. Water-insoluble azo dyes having the following general formula:

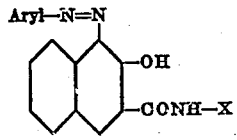

in which aryl represents the radical of an arylamine of the fluorinated naphthalene series and X represents an aryl radical.

14. Water-insoluble azo dyes having the following general formula:

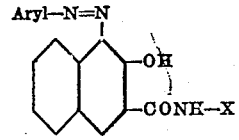

in which aryl represents the radical of an arylamine of the fluorinated diphenyl series, and X represents an aryl radical.

15. Water-insoluble azo dyes having the following general formula:

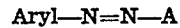

Aryl—N=N—A in which aryl represents the radical of an arylamine having a fluorinated nucleus, and A represents the aryl radical of an ice color coupling component.

16. Water-insoluble azo dyes having the following general formula:

Aryl—N=N—A in which aryl represents the radical of an arylamine of the benzene or naphthalene series having a fluorinated nucleus, and A represents the aryl radical of an ice color coupling component.

17. An azo dye of the ice color class being composed of a diazotized arylamine coupled to an ice color coupling component and having a fluorine atom substituted for a hydrogen atom of the aryl nucleus of the diazotized component.

EMMET F. HITCH.
MILES A. DAHLEN.
MARTIN E. FRIEDRICH.

CERTIFICATE OF CORRECTION.

Patent No. 2,023,591.  December 10, 1935.

EMMET F. HITCH, ET AL.

It is hereby certified that error appears in the printed specification of the above numbered patent requiring correction as follows: Page 3, second column, line 37, for "m-nitraniline" read m-nitranilide; and that the said Letters Patent should be read with this correction therein that the same may conform to the record of the case in the Patent Office.

Signed and sealed this 18th day of February, A. D. 1936.

Leslie Frazer (Seal)  Acting Commissioner of Patents.